No. 856,740. PATENTED JUNE 11, 1907.
D. W. SNIDER.
DUST PAN.
APPLICATION FILED JUNE 18, 1906.
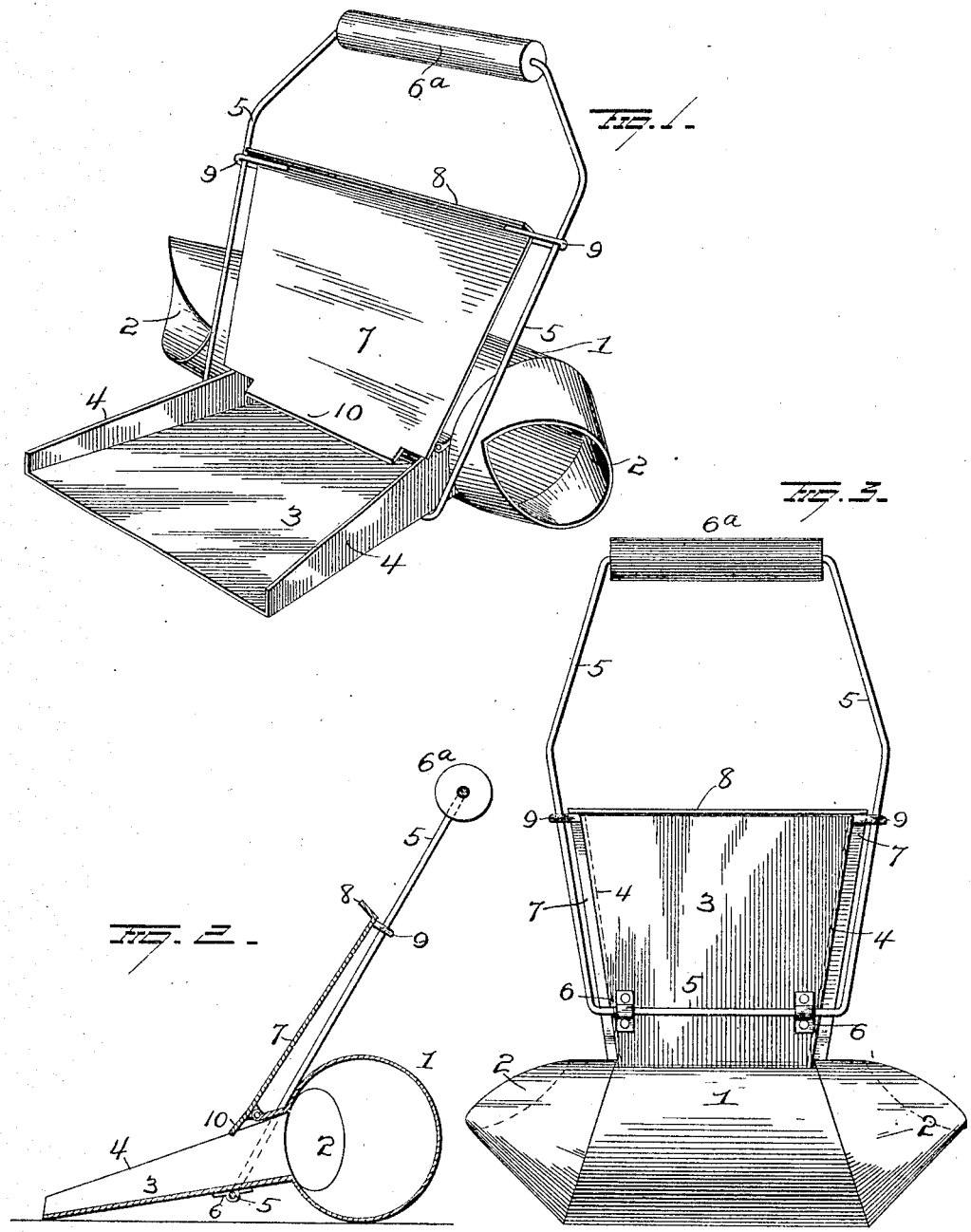
WITNESSES
INVENTOR

UNITED STATES PATENT OFFICE.

DAVID W. SNIDER, OF SALISBURY, NORTH CAROLINA, ASSIGNOR OF ONE-THIRD TO T. D. MANESS AND ONE-THIRD TO E. D. BIVENS, OF SALISBURY, NORTH CAROLINA.

DUST-PAN.

No. 856,740.      Specification of Letters Patent.      Patented June 11, 1907.

Application filed June 18, 1906. Serial No. 322,210.

*To all whom it may concern:*

Be it known that I, DAVID W. SNIDER, a resident of Salisbury, in the county of Rowan and State of North Carolina, have invented certain new and useful Improvements in Dust-Pans; and I do hereby declare the following to be a full, clear, and exact description of the invention, such as will enable others skilled in the art to which it appertains to make and use the same.

My invention relates to an improved dust pan, the object of the invention being to provide an improved dust pan which when placed in position on the floor or other support, will open in position to receive dirt and trash and when raised from the floor will close and direct the dirt and trash into its receptacle or chamber, from which it can be emptied by turning the pan edgewise, and the invention consists in certain novel features of construction and combinations and arrangements of parts as will be more fully hereinafter described and pointed out in the claims.

In the accompanying drawings, Figure 1 is a perspective view illustrating my improvements. Fig. 2 is a sectional view showing the pan open, and Fig 3 is a rear elevation.

1 represents an approximately cylindrical dust receptacle or chamber, having divergent conical open ends 2, which latter incline toward the tray 3, to prevent any escape of the dirt from the chamber 1 when the pan is in an upright position, and hold the dirt in the chamber in all positions of the pan save when the pan is turned edgewise, when the dirt will escape through the open end of the chamber.

The chamber 1 is made with a longitudinal opening, at which point the tray 3 is secured. The tray 3 is preferably narrowest at its point of juncture with the chamber 1 and gradually widens to its outer end, and is provided with side flanges 4, as shown.

5 represents a wire bail, which extends across the under face of tray 3 on which bearings 6 are provided therefor. The ends of the wire are then bent or flared outward in accordance with the flare of tray 3, and are then bent inward and project into the ends of a handle 6ª.

A tray cover 7 is hinged at the inner end of tray 3, conforms in shape to the shape of the tray 3 to cover the same and is made with a flange or lip 8 at its free end, to close the end of tray 3.

Elongated loops 9 are secured to the side edges of cover 7 at its free end, and the wire bail 5 passes through the loops 9 to compel the cover to move with the handle, the loops 9 being necessarily elongated to compensate for the flare of the bail. The cover 7 is also made with a lip 10 at its hinged end, to cover the hinged juncture of the cover and tray, and prevent any escape of dust at this point.

The operation of my improvements is as follows:—In operation, the chamber 1 and tray 3 are in horizontal position and cover 7 is held back in open position by the bail 5. The pan can be moved about the floor by the handle to receive the dirt and trash, and when the device is elevated by the handle, owing to the fact that the cylinder 1 is heavier than the tray 3 (or in other words, the bail is connected to the tray at such a point as to make the chamber 1 overbalance the tray) the chamber 1 will drop down and compel the tray 3 and cover 7 to come together in a vertical position, thus forming a chute directing the dirt and trash down into the chamber 1, the cylindrical or enlarged form of the latter constituting a receptacle for the dirt and preventing any escape even though the device be repeatedly used before emptying. To empty the chamber 1, the pan is turned edgewise, which compels the contents of the chamber to pass out the open end thereof.

A great many slight changes might be made in the general form and arrangement of the parts described, without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. An article of manufacture comprising a tray, an open-ended receptacle secured to said tray and having an elongated opening communicating therewith, the ends of said receptacle projecting beyond the sides of the tray, a hinged cover for the tray, laterally projecting loops in proximity to the free end of the cover, and a bail hinged to the tray and passing through the loops on the cover, the portions of the receptacle which project beyond the sides of the tray constituting supports for the bail to hold the cover in raised position.

2. An article of manufacture comprising a receptacle having an elongated slot, a tray secured to the receptacle and communicating with the slot therein, a cover hinged near the juncture of the tray with the receptacle, said cover provided with a lip to protect the hinged juncture of the cover and tray, and means for operating the cover.

3. The combination with a dust receptacle made with an elongated opening in one side, of a tray secured to the receptacle coincident with said elongated opening, a cover hinged over the tray at a point in proximity to the juncture of the tray with the receptacle, a bail having a part extending across the bottom of the tray and hinged thereto, and loops projecting laterally from the free end of the cover, the side members of the bail passing through said loops.

In testimony whereof, I have signed this specification in the presence of two subscribing witnesses.

DAVID W. SNIDER.

Witnesses:
E. D. BIVENS,
JNO. B. MANLY.